KARL ARVID SKARDAL
INVENTOR.

BY Albert M. Parker
ATTORNEY.

3,446,354
METHOD FOR FRACTIONATING A SUSPENSION OF SOLID PARTICLES
Karl Arvid Skardal, Stockholm, Sweden, assignor to Aktiebolaget Celleco, Stockholm, Sweden, a corporation of Sweden
Filed Dec. 13, 1967, Ser. No. 690,355
Claims priority, application Sweden, Dec. 19, 1966, 17,329/66
Int. Cl. B07b *1/22;* B01d *33/00*
U.S. Cl. 209—250                                           2 Claims

ABSTRACT OF THE DISCLOSURE

Fractionation of a suspension of solid particles is effected by flowing the suspension under pressure through a cylindrical screen and rotating the suspension about the longitudinal axis of the screen and alternating the pressure around the screen between a negative pressure and a positive pressure in relation to the pressure within the screen.

---

The main object of the invention is to prevent solid particles of reject, which are unable to pass through the filter wall of the cylinder and which continue to flow in said cylinder, from building a permanent layer on the filter wall, by causing accept, which during periods of subpressure passes through the filter wall of the cylinder, to flow back through said filter wall during intermediate periods of positive pressure, to exert a dislodging action on the reject particles collected on said filter wall.

It is naturally a desired function with regard to the above method that the dislodging action is effective over the whole filtering area as uniformly as possible, and that said dislodging effect does not result in only a partial clearing effect at some positions and a high reflow of accept at other positions. A basic condition for realising this desideratum is that the clogging tendency to be avoided is as evenly distributed as possible. Since this tendency is strongly dependant on the flow rate of the suspension over the filtering surface, an even flow rate over all portions of said surface would thus cause a particularly favourable effect in the fractionating method.

The invention, which is intended to provide for such a flow in the said context, is characterised in that all the suspension supplied to the screening tube is caused to flow through said tube during successive separation of accept in a helical path, from one end of the screening tube to the other end thereof, the suspension being supplied to one end of the screening tube via a vortex chamber coaxial with said tube.

An arrangement by means of which the invention can be applied is shown diagrammatically as an example in the accompanying drawings.

Figure 1:
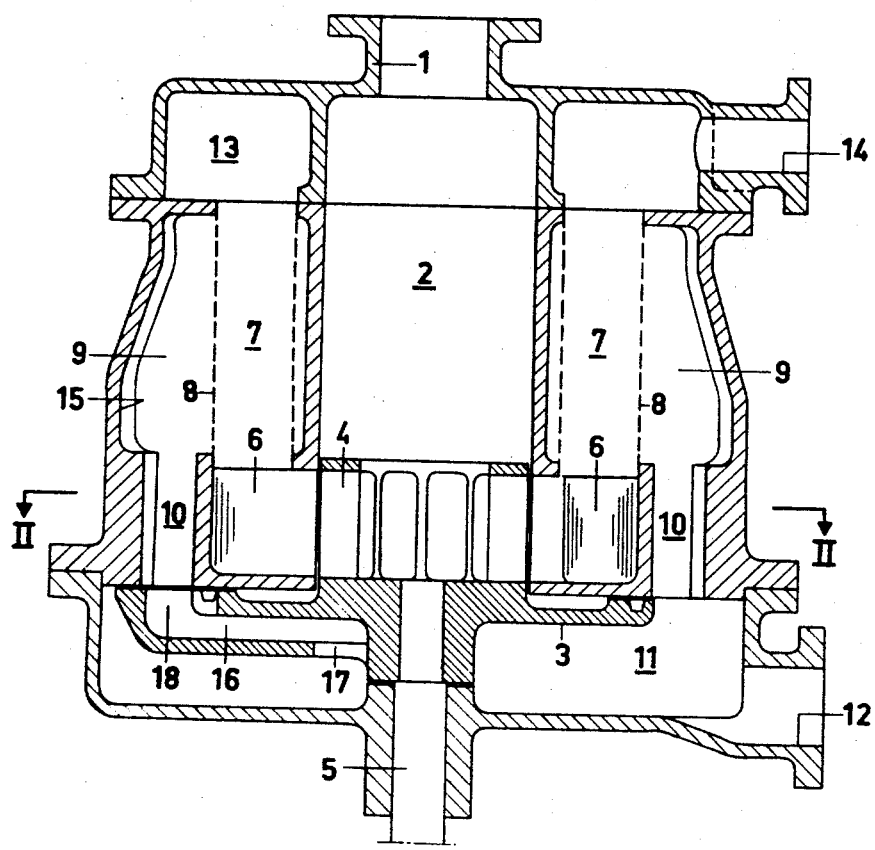
Figure 2:
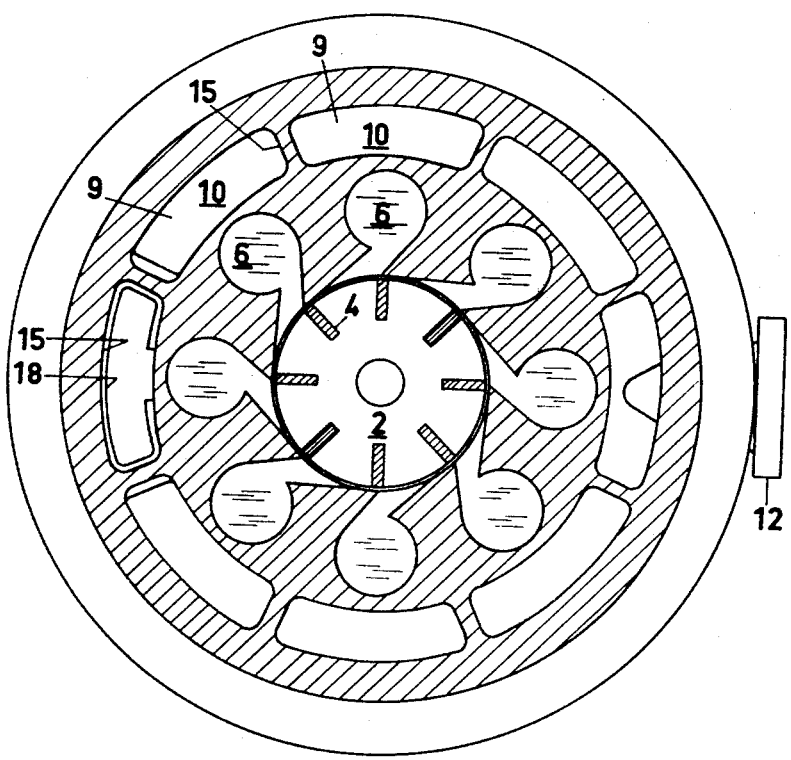

FIG. 1 is a screening arrangement according to the invention in section seen from the side and FIG. 2 shows an arrangement according to FIG. 1 in section seen along the line II—II in FIG. 1.

Identical details in the different figures are indicated by the same reference numerals.

The illustrated arrangement functions in the following manner:

The suspension (inject) is introduced through an inlet 1 to an inject chamber 2 from which it is pumped by means of pump means 3, having vanes 4 on a drive shaft 5, radially outwards to a number of vortex chambers 6 and having filter chambers 7 coaxial therewith within cylindrical tubes 8. By means of swirling movements initiating in the vortex chamber the suspension is passed axially through each screening cylinder in a helical path, from one end of the screening cylinder to the other end thereof. During its passage the inject is fractionated into a reject, which passes out of the arrangement via an outlet chamber 13 and an outlet 14, and an accept which passes through the filter wall and out of the arrangement via accept chambers 9, ports 10, and outlet chamber 11, which is under a lower pressure than the pressure in the filter chamber 7, and an outlet 12.

On operation of the screening arrangement filled with suspension the positive or superatmospheric pressure around the outlet tube will thus effect, that the accept chambers 9, separated by partitions 15, each enclose a screening cylinder 8 and a port 10 and that the pump means 3 is provided with a pump passage 16 presenting inlet 17 and outlets 18 for circulation of accept collected in the outlet chamber 11. Thus, each time the outlet 18 registers with a port 10 during rotation of the pump means accept from the outlet chamber 11 is instantaneously pumped back through the pump passage 16 in corresponding accept chamber 9 at a pressure exceeding the pressure in corresponding screening chambers 7, the positive pressure ceasing when outlet 18 leaves said position and the accept is instead circulated through the pump passage into the outlet chamber 11.

What I claim is:

1. A method in the fractionation of a suspension of solid particles by passing the suspension mainly in axial direction and under pressure through an elongated tubular screen of circular cross section, which comprises in combination the following steps, introducing the suspension into the screen at one end thereof in the form of a stream, rotating that stream around the longitudinal axis of the screen, maintaining within the screen a substantially constant pressure on the suspension acting against the screen wall whereby said particles are separated into an accept fraction which passes through the screen into an outer chamber surrounding said screen and a reject fraction which flows through the other end of said screen and alternately varying the pressure on the outside of the screen between a pressure in excess of and a pressure below the pressure within the screen by reintroducing accept material from said outer chamber through said screen wall, to assure a good flow through said screen.

2. A method as in claim 1 and periodically effecting said varying of the pressure on the outside of the screen.

References Cited

UNITED STATES PATENTS

| | | | |
|---|---|---|---|
| 1,921,750 | 8/1933 | Heinrich | 209—273 |
| 2,302,449 | 11/1942 | Laughlin. | |
| 3,174,622 | 3/1965 | Lamort | 209—273 |
| 3,221,886 | 12/1965 | Lamort | 209—380 X |
| 3,261,468 | 7/1966 | Dick | 209—243 |

FOREIGN PATENTS 515,859    12/1952    Belgium.

FRANK W. LUTTER, *Primary Examiner.*

U.S. Cl. X.R.

209—273, 306, 380; 210—82, 412